(12) United States Patent
Wiederin

(10) Patent No.: US 10,711,927 B2
(45) Date of Patent: Jul. 14, 2020

(54) LONG FERRULE

(71) Applicant: Daniel R. Wiederin, Omaha, NE (US)

(72) Inventor: Daniel R. Wiederin, Omaha, NE (US)

(73) Assignee: ELEMENTAL SCIENTIFIC, INC., Omaha, NE (US)

( * ) Notice: Subject to any disclaimer, the term of this patent is extended or adjusted under 35 U.S.C. 154(b) by 39 days.

(21) Appl. No.: 15/124,892

(22) PCT Filed: Mar. 9, 2016

(86) PCT No.: PCT/US2016/021574
§ 371 (c)(1),
(2) Date: Sep. 9, 2016

(87) PCT Pub. No.: WO2016/145088
PCT Pub. Date: Sep. 15, 2016

(65) Prior Publication Data
US 2017/0363231 A1 Dec. 21, 2017

Related U.S. Application Data

(60) Provisional application No. 62/130,260, filed on Mar. 9, 2015.

(51) Int. Cl.
*E21B 19/14* (2006.01)
*E21B 19/20* (2006.01)
(Continued)

(52) U.S. Cl.
CPC ............. *F16L 19/07* (2013.01); *F16L 33/18* (2013.01); *F16L 33/24* (2013.01)

(58) Field of Classification Search
USPC .... 414/427, 428, 619, 22.63, 680, 584, 740, 414/743
See application file for complete search history.

(56) References Cited

U.S. PATENT DOCUMENTS 4,621,843 A * 11/1986 Straub .................... F16L 19/07
285/356
5,131,689 A 7/1992 Bates
(Continued)

FOREIGN PATENT DOCUMENTS

CN 201902706 U 7/2011
WO 9745666 A1 12/1997

OTHER PUBLICATIONS

International Search Report and Written Opinion dated May 11, 2016 for PCT/US2016/021547.
(Continued)

*Primary Examiner* — Anna M Momper
*Assistant Examiner* — Douglas S Wood
(74) *Attorney, Agent, or Firm* — Kevin E. West; Advent, LLP

(57) ABSTRACT

A ferrule includes a flange and an elongated sleeve extending from the flange. The flange and the elongated sleeve define a bore, which is configured to receive a length of flexible tubing. The elongated sleeve is configured to hold the flexible tubing within the bore via friction. For example, the elongated sleeve is configured to hold the flexible tubing within the bore without compressing the flexible tubing. In this manner, flow through the flexible tubing may be unrestricted. In some embodiments, a distance of flexible tubing contacted by the elongated sleeve is sufficient to hold the flexible tubing within the elongated sleeve without tightly holding or compressing the flexible tubing. This configuration can prevent narrow tubing from becoming blocked and/or the tubing bore can remain smooth (e.g., for accurate mixing, constant fluid flow, and so forth).

18 Claims, 5 Drawing Sheets

(51) Int. Cl.
*F16L 19/07* (2006.01)
*F16L 33/18* (2006.01)
*F16L 33/24* (2006.01)

(56) References Cited

U.S. PATENT DOCUMENTS

| | | | |
|---|---|---|---|
| 5,192,095 A | 3/1993 | Behrens | |
| 6,106,027 A | 8/2000 | Mulvey et al. | |
| 9,056,264 B2 * | 6/2015 | Hahn | F16L 58/10 |
| 2014/0131997 A1 * | 5/2014 | Burger | G01N 30/6039 |
| | | | 285/285.1 |

OTHER PUBLICATIONS

International Preliminary Report on Patentability dated Sep. 21, 2017 for PCT/US2016/021574.

* cited by examiner

LONG FERRULE

BACKGROUND

Generally, a ferrule is a ring or cap that can be used to strengthen the end of a handle, a stick, a tube, and so forth.

SUMMARY

A ferrule includes a flange and an elongated sleeve extending from the flange. The flange and the elongated sleeve define a bore, which is configured to receive a length of flexible tubing. The elongated sleeve is configured to hold the flexible tubing within the bore via friction. For example, the elongated sleeve is configured to hold the flexible tubing within the bore without compressing the flexible tubing. In this manner, flow through the flexible tubing may be unrestricted. In some embodiments, a distance of flexible tubing contacted by the elongated sleeve is sufficient to hold the flexible tubing within the elongated sleeve without tightly holding or compressing the flexible tubing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Figure 1:
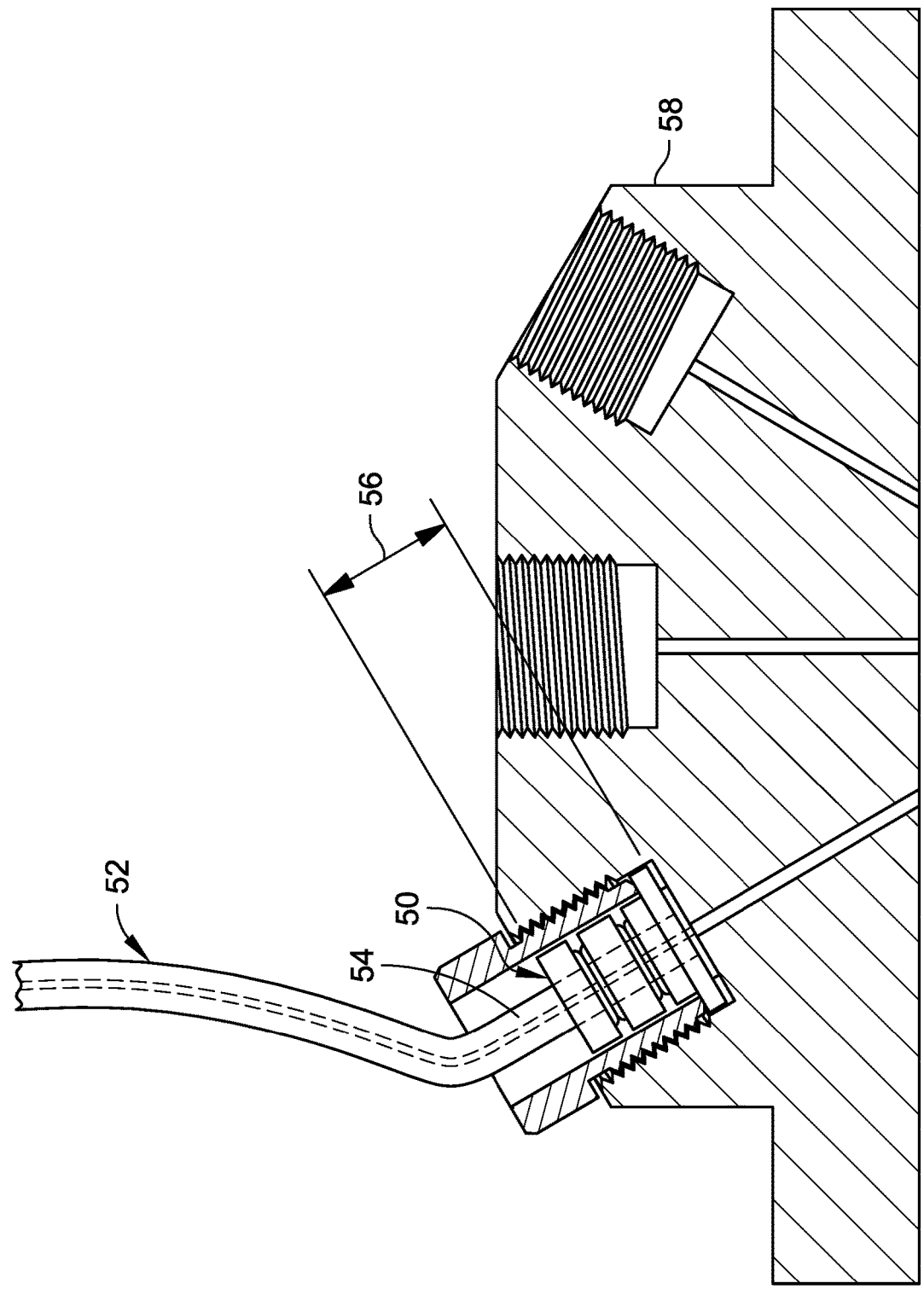
FIG. 1 is a cross-sectional side elevation view illustrating flexible tubing and a ferrule connected to a valve.

Ferrules are used for fastening, joining, sealing, and so forth. A ferrule can be a narrow circular ring. For example, with reference to FIG. 1, a ferrule 50 can be attached to a length of tubing 52, tightly holding and/or compressing an end 54 of the tubing 52 over a short distance 56. This configuration can lead to crimping of the tubing 52. For example, when narrow tubing 52 is connected to a valve 58, a crimp in the tubing 52 where the tubing exits the valve 58 may further narrow the tubing 52, causing particulates to collect in the tube and possibly leading to blockage of the tubing 52. Further, because the tubing 52 is tightly held and/or compressed by the ferrule 50, the tubing 52 may be cut to remove the ferrule 50, which is then discarded and replaced. Ultimately the tubing itself may also be replaced (e.g., as it becomes shorter and shorter). In some instances, when the tubing 52 is handled, a user grasps the tubing 52 proximate to the ferrule 50 and pulls on the tubing 52 (e.g., to remove the tubing 52 from the valve 58). This can lead to narrowing and possibly blockage of the tubing 52.

Figure 2:
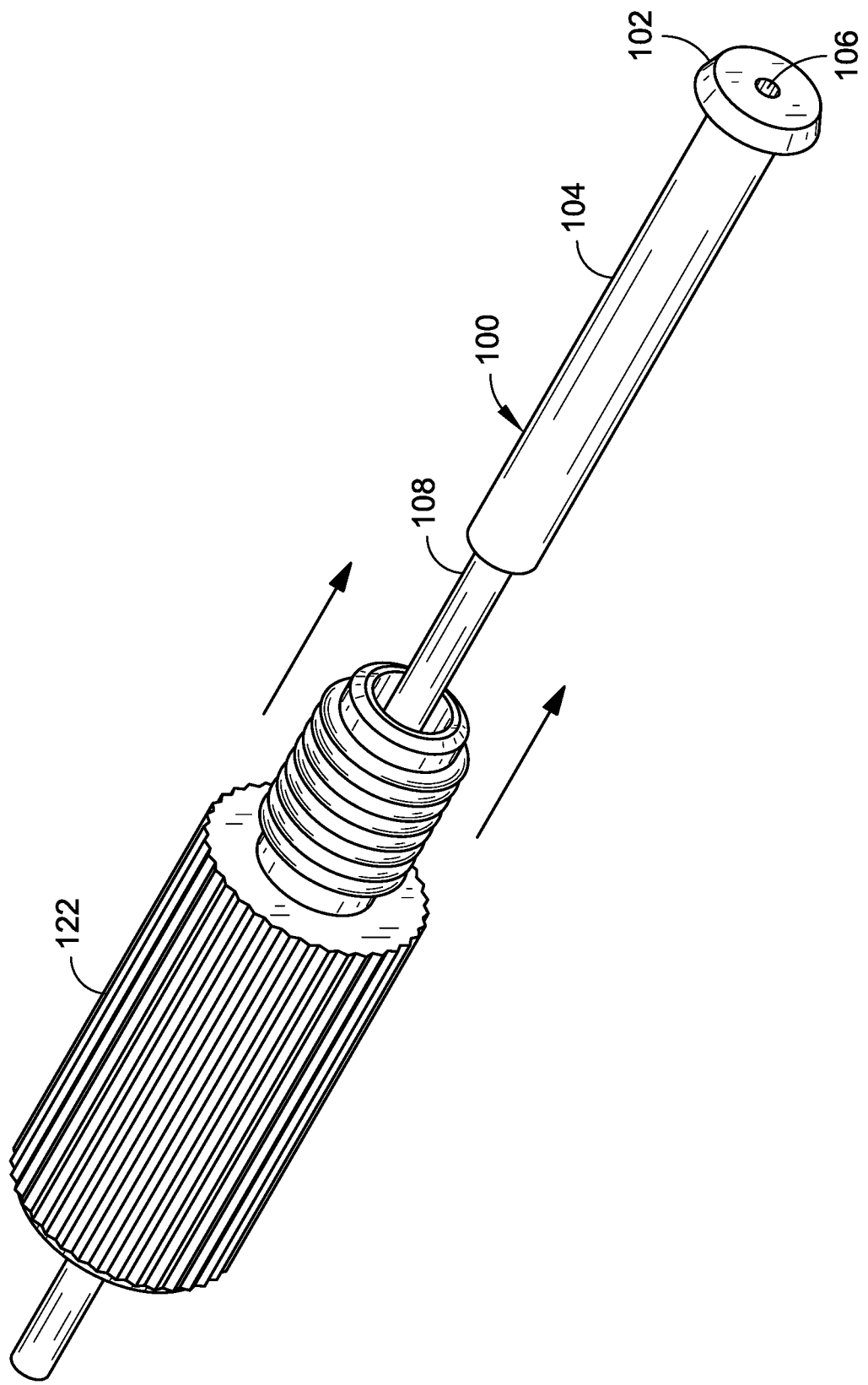
FIG. 2 is an exploded isometric view illustrating flexible tubing connected to a ferrule, and a threaded nut in accordance with an example embodiment of the present disclosure.

Referring generally to FIGS. 1 and 2, a ferrule 100 is described in accordance with example embodiments of the present disclosure. The ferrule 100 includes a flange 102 and an elongated sleeve 104 extending from the flange 102. In embodiments of the disclosure, the flange 102 and the elongated sleeve 104 define a bore 106, which is configured to receive a length of flexible tubing 108. The elongated sleeve 104 is configured to hold the flexible tubing 108 within the bore 106 via friction. For example, the elongated sleeve 104 is configured to hold the flexible tubing 108 within the bore 106 without compressing the flexible tubing 108. In this manner, flow through the flexible tubing 108 may be unrestricted. In some embodiments, a distance 110 of flexible tubing 108 contacted by the elongated sleeve 104 is sufficient to hold the flexible tubing 108 within the elongated sleeve 104 without tightly holding or compressing the flexible tubing 108 at one or several narrow points (e.g., as previously described with reference to the ferrule 50 shown in FIG. 1).

In an example, the elongated sleeve 104 may have an inside diameter of at least approximately sixty-seven one-thousandths of an inch (0.067 in.) and a length (e.g., the distance 110 of flexible tubing 108 contacted by the elongated sleeve 104) of at least approximately ninety-six one-hundredths of an inch (0.96 in.). This configuration can prevent narrow tubing from becoming blocked and/or the tubing bore may remain smooth (e.g., for accurate mixing, constant fluid flow, and so forth). It should be noted that the dimensions described herein are provided by way of example and are not meant to limit the present disclosure. For example, the elongated sleeve 104 may have a different inside diameter, a different length, and so forth. In some embodiments, a ratio of the length of the elongated sleeve 104 to the inside diameter of the elongated sleeve 104 may range from at least approximately ten (10) to at least approximately twenty (20) (e.g., at least approximately fourteen (14)).

Figure 3:
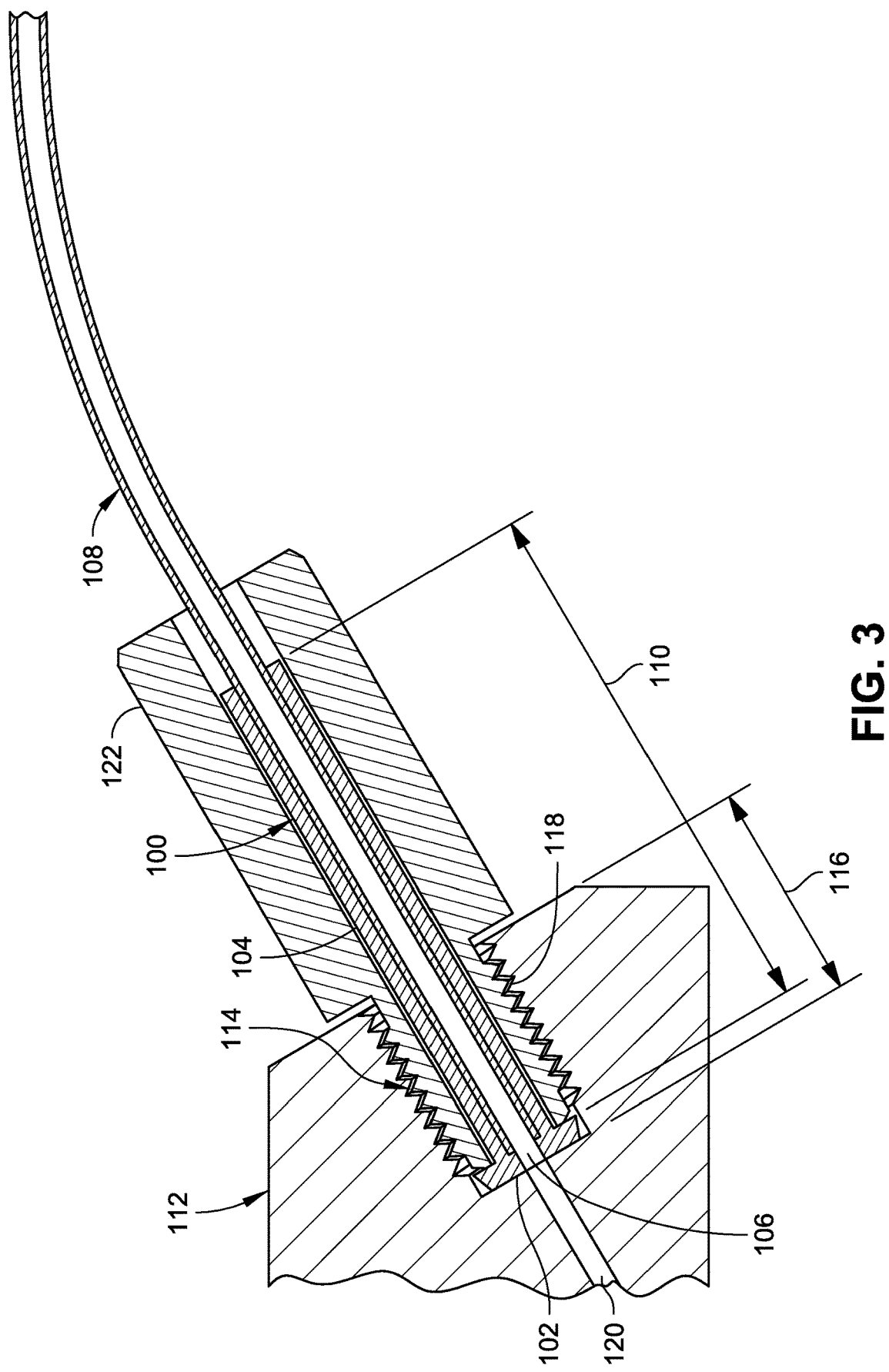
FIG. 3 is a cross-sectional side elevation view of the flexible tubing, the ferrule, and the threaded nut illustrated in FIG. 1, where the ferrule is retained in a valve by the threaded nut in accordance with an example embodiment of the present disclosure.

Further, it is noted that the elongated sleeve 104 can provide a handle for removal of the ferrule 100 and soft flexible tubing 108 from a system (e.g., from a valve 112). For example, the long ferrule 100 can be gripped external to a fitting, allowing the ferruled-tubing to be pulled out by the ferrule 100 rather than by the flexible tubing 108. This configuration can reduce or minimize damage to the ferrule seal, reduce or prevent accidental removal of the flexible tubing 108 from the ferrule 100, prevent the ferrule 100 from getting caught inside threads and/or a hole of a mounting fitting (e.g., of the valve 112), and so forth. For instance, with reference to FIG. 3, a system including valve 112 has a port 114 that receives the flange 102 so that the flange 102 abuts an end surface of the port 114. In this example, the port 114 has a depth 116, a threaded sidewall 118, and a fluid passage 120, and the ferrule 100 is retained within the port 114 by a threaded nut 122 disposed around the elongated sleeve 104. The length of the elongated sleeve 104 (e.g., the distance 110 of flexible tubing 108 contacted by the elongated sleeve 104) is greater than the depth 116 of the port 114. To remove the flexible tubing 108, the threaded nut 122 is removed, and then the flexible tubing 108 can be grasped by the elongated sleeve 104 and pulled from the valve 112.

Figure 4:
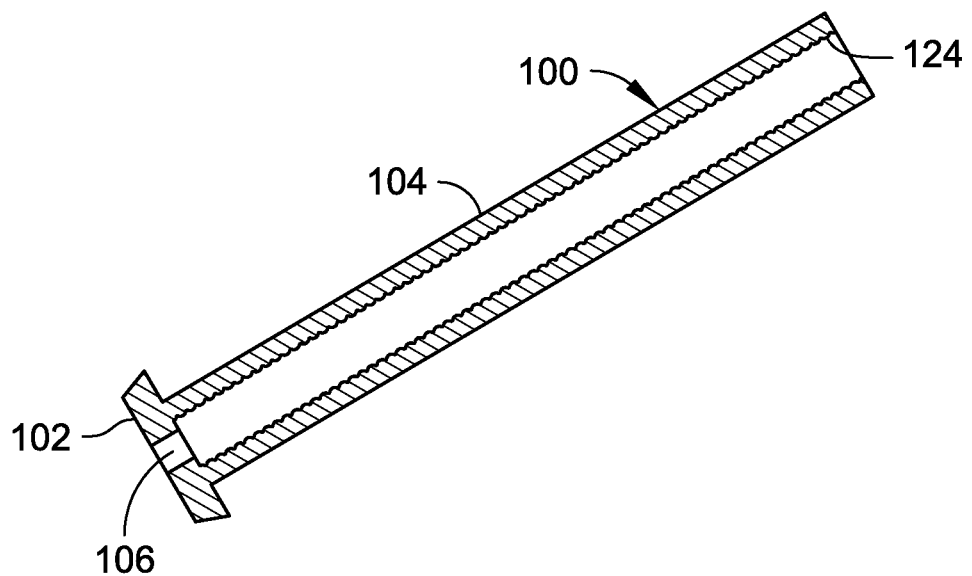
FIG. 4 is a cross-sectional side elevation view illustrating a ferrule, where an internal surface of the ferrule includes ridges in accordance with an example embodiment of the present disclosure.
Figure 5:
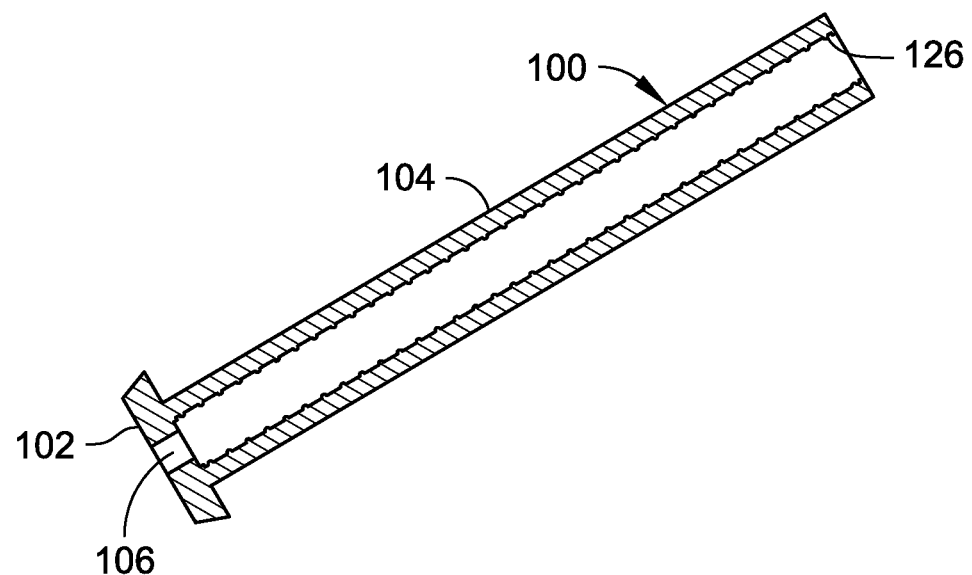
FIG. 5 is a cross-sectional side elevation view illustrating a ferrule, where an internal surface of the ferrule includes rings in accordance with an example embodiment of the present disclosure.
Figure 6:
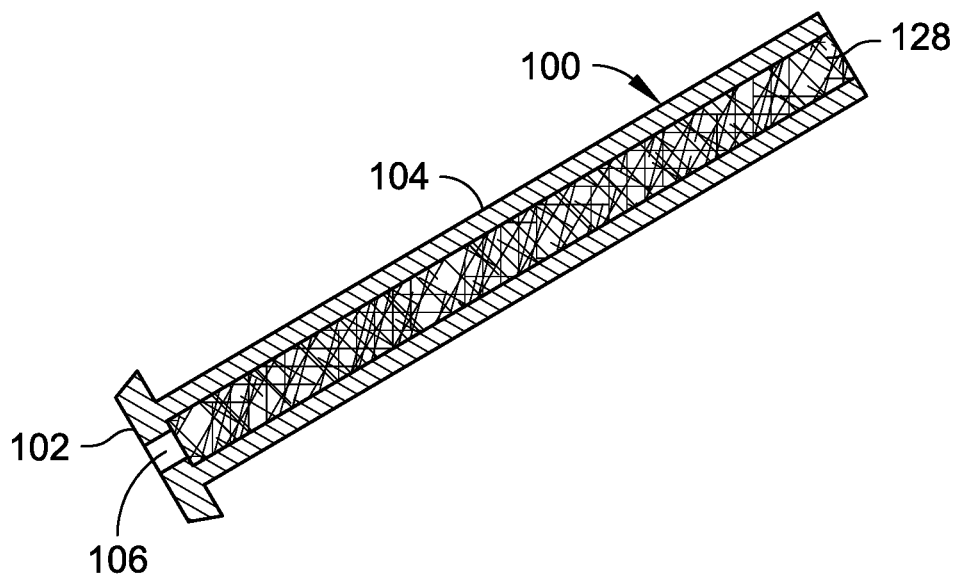
FIG. 6 is a cross-sectional side elevation view illustrating a ferrule, where an internal surface of the ferrule includes abrasions in accordance with an example embodiment of the present disclosure.
Figure 7:
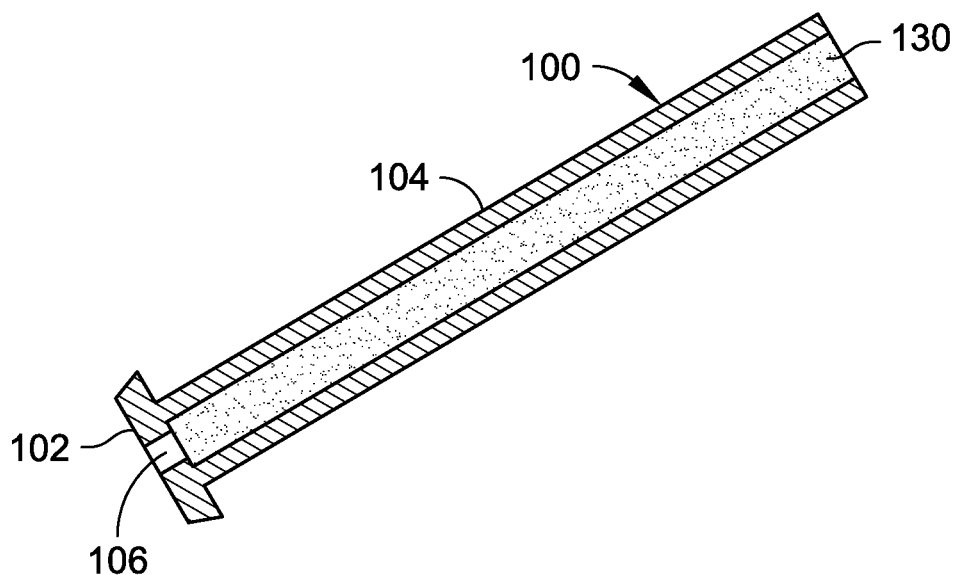
FIG. 7 is a cross-sectional side elevation view illustrating a ferrule, where an internal surface of the ferrule includes a roughened surface in accordance with an example embodiment of the present disclosure.

In some embodiments, a ferrule 100 is not compressed during assembly and may be reused on another tube. In some embodiments, a ferrule 100 can be constructed from a soft material, such as a perfluoroalkoxy alkane (PFA) material, one or more other fluoropolymers, and so on. In this manner, a high purity ferrule can be provided, which may also have a high chemical resistance. In some embodiments, a ferrule 100 can be used with flanged tubing for additional support, reduction or prevention of leaking, and so forth. In some embodiments, the ferrule 100 can include one or more internal surface features (e.g., to enhance retention of the flexible tubing 108), including, but not necessarily limited to: ridges, rings, abrasions, a roughened surface, and so on. For example, with reference to FIG. 4, the interior of a ferrule 100 can include ridges 124. In another example, the interior of a ferrule 100 can include rings 126 (e.g., as described with reference to FIG. 5). With reference to FIG. 6, the interior of a ferrule 100 can include abrasions 128. In a further example, the interior of a ferrule 100 can include a roughened surface 130. In this manner, the flexible tubing 108 can be held without excessive swaging and/or crimping on the internal diameter of the flexible tubing 108.

In some embodiments, the ferrule 100 can be press-fit onto the flexible tubing 108. For example, the ferrule 100 can have an inside diameter of at least approximately sixty-seven one-thousandths of an inch (0.067 in.), and the flexible tubing 108 can have an outside diameter of at least approximately sixty-one one-thousandths of an inch (0.061 in.). In other embodiments, the ferrule 100 and/or the flexible tubing 108 can be heated and/or cooled to facilitate insertion of the ferrule 100 onto the flexible tubing 108 and/or retention of the flexible tubing 108 in the ferrule 100. For example, the ferrule 100 can be heated to expand the ferrule 100 before inserting tubing into the ferrule 100.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A ferrule, comprising:
   a flange; and
   an elongated sleeve extending from the flange, the flange and the elongated sleeve defining a bore disposed there through configured to receive a length of flexible tubing, the elongated sleeve configured to hold the length of flexible tubing within the bore via friction, wherein a ratio of a length of the elongated sleeve to an inside diameter of the elongated sleeve ranges from at least approximately ten to at least approximately twenty.

2. The ferrule as recited in claim 1, wherein the inside diameter of the elongated sleeve is at least approximately sixty-seven one-thousandths of an inch (0.067 in.), and the length of the elongated sleeve is at least approximately ninety-six one-hundredths of an inch (0.96 in.).

3. The ferrule as recited in claim 1, wherein the ferrule is constructed from a fluoropolymer material.

4. The ferrule as recited in claim 1, further comprising an internal surface feature to enhance retention of the length of flexible tubing.

5. The ferrule as recited in claim 4, wherein the internal surface feature comprises at least one of a ridge, an abrasion, or a roughened surface.

6. The ferrule as recited in claim 1, wherein the flange is configured to be received in a port of a system so that the flange abuts an end surface of the port, the port having a depth, a threaded sidewall, and a fluid passage, the ferrule retained within the port by a threaded nut disposed around the elongated sleeve, wherein the elongated sleeve has a length that is greater than the depth of the port.

7. A fluid connector comprising:
   a length of flexible tubing;
   a flange having an insider diameter and a first end surface in a first plane;
   an elongated sleeve extending from the flange, the elongated sleeve having an inside diameter greater than the inside diameter of the flange, the flange and the elongated sleeve defining a second end surface opposite the first end surface and between the inside diameter of the flange and the inside diameter of the elongated sleeve in a second plane spaced apart from the first plane, the flange and the elongated sleeve defining a bore disposed there through configured to receive the length of flexible tubing to abut the flange at the second end surface opposite the first end surface, the elongated sleeve configured to hold the length of flexible tubing within the bore via friction and allow the flange to be compressed between the first plane and the second plane without compressing the length of flexible tubing;
   a port having a depth, a threaded sidewall, and a fluid passage, wherein the flange is configured to be received in the port so that the flange abuts an end surface of the port; and
   a threaded nut disposed around the elongated sleeve for retaining the ferrule within the port, wherein the elongated sleeve has a length that is greater than the depth of the port.

8. The fluid connector as recited in claim 7, wherein a ratio of a length of the elongated sleeve to an inside diameter of the elongated sleeve ranges from at least approximately ten to at least approximately twenty.

9. The fluid connector as recited in claim 7, wherein the elongated sleeve has an inside diameter of at least approximately sixty-seven one-thousandths of an inch (0.067 in.) and a length of at least approximately ninety-six one-hundredths of an inch (0.96 in.).

10. The fluid connector as recited in claim 7, wherein the elongated sleeve and the flange are constructed from a fluoropolymer material.

11. The fluid connector as recited in claim 7, wherein the elongated sleeve has an internal surface feature to enhance retention of the length of flexible tubing.

12. The fluid connector as recited in claim 11, wherein the internal surface feature comprises at least one of a ridge, an abrasion, or a roughened surface.

13. A ferrule, comprising:
   a flange having an insider diameter and a first end surface in a first plane; and
   an elongated sleeve extending from the flange, the elongated sleeve having an insider diameter greater than the inside diameter of the flange, the flange and the elongated sleeve defining a second end surface opposite the first end surface and between the inside diameter of the flange and the inside diameter of the elongated sleeve in a second plane spaced apart from the first plane, the flange and the elongated sleeve defining a bore disposed there through configured to receive a length of flexible tubing to abut the flange at the second end surface opposite the first end surface, the elongated sleeve configured to hold the length of flexible tubing within the bore via friction and allow the flange to be compressed between the first plane and the second plane without compressing the length of flexible tubing.

14. The ferrule as recited in claim 13, wherein a ratio of a length of the elongated sleeve to an inside diameter of the elongated sleeve ranges from at least approximately ten to at least approximately twenty.

15. The ferrule as recited in claim 13, wherein the ferrule is constructed from a fluoropolymer material.

16. The ferrule as recited in claim 13, further comprising an internal surface feature to enhance retention of the length of flexible tubing.

17. The ferrule as recited in claim 16, wherein the internal surface feature comprises at least one of a ridge, an abrasion, or a roughened surface.

18. The ferrule as recited in claim 13, wherein the flange is configured to be received in a port of a system so that the flange abuts an end surface of the port, the port having a depth, a threaded sidewall, and a fluid passage, the ferrule retained within the port by a threaded nut disposed around the elongated sleeve, wherein the elongated sleeve has a length that is greater than the depth of the port.

* * * * *